(12) United States Patent
Silvi et al.

(10) Patent No.: US 9,302,220 B2
(45) Date of Patent: Apr. 5, 2016

(54) EXTRUDER SYSTEM AND METHOD FOR TREATMENT OF A GASEOUS MEDIUM

(71) Applicant: General Electric Company, Schenectady, NY (US)

(72) Inventors: Norberto Silvi, Clifton Park, NY (US); Robert James Perry, Niskayuna, NY (US); Surinder Prabhjot Singh, Schenectady, NY (US); Gary Stephen Balch, Ballston Spa, NY (US); Tiffany Elizabeth Pinard Westendorf, Troy, NY (US)

(73) Assignee: General Electric Company, Niskayuna, NY (US)

( * ) Notice: Subject to any disclaimer, the term of this patent is extended or adjusted under 35 U.S.C. 154(b) by 184 days.

(21) Appl. No.: 14/078,815

(22) Filed: Nov. 13, 2013

(65) Prior Publication Data
US 2015/0132204 A1    May 14, 2015

(51) Int. Cl.
| | |
|---|---|
| *B01D 53/06* | (2006.01) |
| *B01D 53/08* | (2006.01) |
| *B01D 53/18* | (2006.01) |
| *B01D 53/73* | (2006.01) |
| *B01D 53/78* | (2006.01) |

(Continued)

(52) U.S. Cl.
CPC ............ *B01D 53/62* (2013.01); *B01D 53/1425* (2013.01); *B01D 53/18* (2013.01); *B01D 53/78* (2013.01); *B01D 53/96* (2013.01); *B01D 2252/204* (2013.01); *B01D 2257/104* (2013.01); *B01D 2257/404* (2013.01); *B01D 2257/502* (2013.01); *B01D 2257/504* (2013.01); *B01D 2257/80* (2013.01); *B01D 2258/0283* (2013.01); *B01D 2258/05* (2013.01)

(58) Field of Classification Search
None
See application file for complete search history.

(56) References Cited

U.S. PATENT DOCUMENTS

| | | | |
|---|---|---|---|
| 2,449,355 | A | 9/1948 | Wiley et al. |
| 4,355,905 | A | 10/1982 | St. Louis et al. |

(Continued)

FOREIGN PATENT DOCUMENTS

EP    0825919 B1    12/1999

OTHER PUBLICATIONS

Bacsik et al., "Temperature-induced Uptake of $CO_2$ and Formation of Carbamates in Mesocaged Silica Modified with n-propylamines", Langmuir : the Acs Journal of Surfaces and Colloids, vol. 26, Issue 12, 2010, pp. 10013 - 10024.

(Continued)

*Primary Examiner* — Stuart Hendrickson
*Assistant Examiner* — Daniel Berns
(74) *Attorney, Agent, or Firm* — Francis T. Coppa (57) ABSTRACT

A system for treatment of a gaseous medium, comprises an extruder having a barrel. The extruder further comprises a first inlet port, a second inlet port, and a plurality of outlet ports coupled to the barrel. The first inlet port is configured for feeding a lean sorbent, the second inlet port is configured for feeding a gaseous medium, and the plurality of outlet ports are configured for releasing a plurality of components removed from the gaseous medium. Further, the extruder comprises a plurality of helical elements coupled to a plurality of kneading elements, mounted on a shaft, and disposed within the barrel. The barrel and the plurality of helical and kneading elements together form an absorption unit and a desorption unit. The first and second inlet ports are formed in the absorption unit and the plurality of outlet ports are formed in the absorption and desorption units.

10 Claims, 7 Drawing Sheets

(51) Int. Cl.
*B01D 53/80* (2006.01)
*B01D 53/83* (2006.01)
*B01D 53/96* (2006.01)
*B01D 53/14* (2006.01)
*B01D 53/62* (2006.01)

(56) References Cited

U.S. PATENT DOCUMENTS

| | | | |
|---|---|---|---|
| 5,597,891 | A | 1/1997 | Nelson et al. |
| 6,790,929 | B2 | 9/2004 | Silvi et al. |
| 6,949,622 | B2 | 9/2005 | Silvi et al. |
| 7,053,168 | B2 | 5/2006 | Silvi et al. |
| 7,842,126 | B1 | 11/2010 | Dilmore et al. |
| 7,927,403 | B2 | 4/2011 | Versteeg et al. |
| 8,030,509 | B2 | 10/2011 | Perry et al. |
| 8,034,166 | B2 | 10/2011 | Asprion et al. |
| 8,318,116 | B2 | 11/2012 | Hu |
| 2006/0165574 | A1 | 7/2006 | Sayari |
| 2011/0100217 | A1 | 5/2011 | Soloveichik et al. |
| 2012/0027663 | A1 | 2/2012 | Pinard et al. |
| 2013/0052109 | A1 | 2/2013 | Davis et al. |

OTHER PUBLICATIONS

Perry et al., "Aminosilicone Solvents for CO2 Capture", ChemSusChem, vol. 3, Issue 8, 2010, pp. 919-930.

Sakpal et al., "Carbon dioxide Capture using Amine Functionalized Silica Gel", Indian Journal of Chemistry, vol. 51A, Sep.-Oct. 2012, pp. 1214-1222.

"Single-Screw Extruder Experiment", ChE 4285 and CHEM 4010, Downloaded from Internet:<http://macro.lsu.edu/CoreCourses/MSweb4/IE/DooleyRheologyProcessing/EXTRUSION_EXP_MAN_11.pdf?_sm_au_=iVVJn3T33sQr26n7>, 2010, 7 Pages.

Perry, "Carbon Capture Technology Development at GE", GE Global Research, Feb. 22, 2013, 64 Pages.

EXTRUDER SYSTEM AND METHOD FOR TREATMENT OF A GASEOUS MEDIUM

This invention was made with Government support under contract number DE-AR0000084 awarded by U.S. Department of Energy. The Government has certain rights in the invention.

BACKGROUND

The present invention relates generally to a treatment of a medium, and more particularly to a system and method for treatment of a gaseous medium, using a lean sorbent.

The emission of carbon dioxide (herein also referred as "$CO_2$") to environment is considered to be a cause of greenhouse effect, which contributes to global warming The greenhouse effect is controlled by reducing the emission of the $CO_2$ to the environment. Some known techniques have been deployed to reduce the emission of the $CO_2$ from an exhaust gaseous medium to the environment. Such known techniques comprise using adsorbents, molecular filters or membranes, and absorber systems for removal of $CO_2$ from the exhaust gaseous medium.

Currently, there are various types of treatment systems for removal of $CO_2$ from the exhaust gaseous medium, such as a "spray tower", a "fixed-bed reactor" a "moving-bed reactor", and "continuous tank reactor". Such treatment system and processes are generally expensive, consumes more energy, labor intensive, and occupies large volume when processed for a high throughput. Further, most of such reactors operate in batches resulting in relatively long residence time for the treatment medium. Also, such reactors have a low throughput rates thereby increasing processing cost.

There is a need for an improved system and method for treating a gaseous medium, using a rich sorbent.

BRIEF DESCRIPTION

In accordance with one exemplary embodiment, a system for treatment of a gaseous medium is disclosed. The system comprises an extruder having a barrel, a first inlet port, a second inlet port, and a plurality of outlet ports. The first inlet port, the second inlet port, and the plurality of outlet ports are coupled to the barrel. The first inlet port is configured for feeding a lean sorbent, the second inlet port is configured for feeding a gaseous medium, and the plurality of outlet ports are configured for releasing a plurality of components removed from the gaseous medium. Further, the extruder comprises a plurality of helical elements and a plurality of kneading elements mounted on a shaft and disposed within the barrel. The plurality of helical elements are coupled to the plurality of kneading elements. The barrel, the plurality of helical elements, and the plurality of kneading elements together form an absorption unit and a desorption unit. Further, the first inlet port and the second inlet port are formed in the absorption unit and the plurality of outlet ports are formed in the absorption unit and the desorption unit.

In accordance with one exemplary embodiment, a method for treatment of a gaseous medium is disclosed. The method comprises a step for reacting a lean sorbent with a gaseous medium within an absorption unit so as to absorb a component from the gaseous medium and generate a rich sorbent. The method further comprises feeding the rich sorbent from the absorption unit to a desorption unit. Further, the method comprises desorbing the absorbed component from the rich sorbent in the desorption unit and regenerating the lean sorbent. The process of reacting, feeding, and desorbing are performed via a plurality of helical elements and a plurality of kneading elements mounted on a shaft disposed within a barrel of an extruder.

DRAWINGS

These and other features and aspects of embodiments of the present disclosure will become better understood when the following detailed description is read with reference to the accompanying drawings in which like characters represent like parts throughout the drawings, wherein:

FIG. 5b is a block diagram of a portion of a barrel in a desorption unit in accordance with the exemplary embodiments of FIGS. 4 and 5a.

DETAILED DESCRIPTION

While only certain features of embodiments have been illustrated and described herein, many modifications and changes will occur to those skilled in the art. It is, therefore, to be understood that the appended claims are intended to cover all such modifications and changes as falling within the spirit of the invention.

Embodiments discussed herein disclose systems and methods for treatment of a gaseous medium. More particularly, certain embodiments of the present invention disclose a system comprising an extruder having an absorption unit and a desorption unit. The absorption and desorption units comprise a plurality of helical elements and a plurality of kneading elements mounted on a shaft and disposed within a barrel. The absorption unit is configured to enable reaction of a lean sorbent with a gaseous medium so as to absorb a component from the gaseous medium and generate a rich sorbent. The desorption unit is configured to remove the absorbed component from the rich sorbent so as to regenerate the lean sorbent.

More specifically, certain embodiments of the present invention disclose an extruder system comprising an extruder having a barrel, a first inlet port, a second inlet port, and a plurality of outlet ports. The first inlet port, the second inlet port, and the plurality of outlet ports are coupled to the barrel. The first inlet port is configured for feeding a lean sorbent, the second inlet port is configured for feeding a gaseous medium, and the plurality of outlet ports are configured for releasing a plurality of components removed from the gaseous medium. Further, the extruder comprises a plurality of helical elements and a plurality of kneading elements mounted on a shaft and disposed within the barrel. The plurality of helical elements are coupled to the plurality of kneading elements. The barrel, the plurality of helical elements, and the plurality of kneading elements together form an absorption unit and a desorption unit. Further, the first inlet port and the second inlet port are formed in the absorption unit and the plurality of outlet ports are formed in the absorption unit and the desorption unit.

Figure 1:
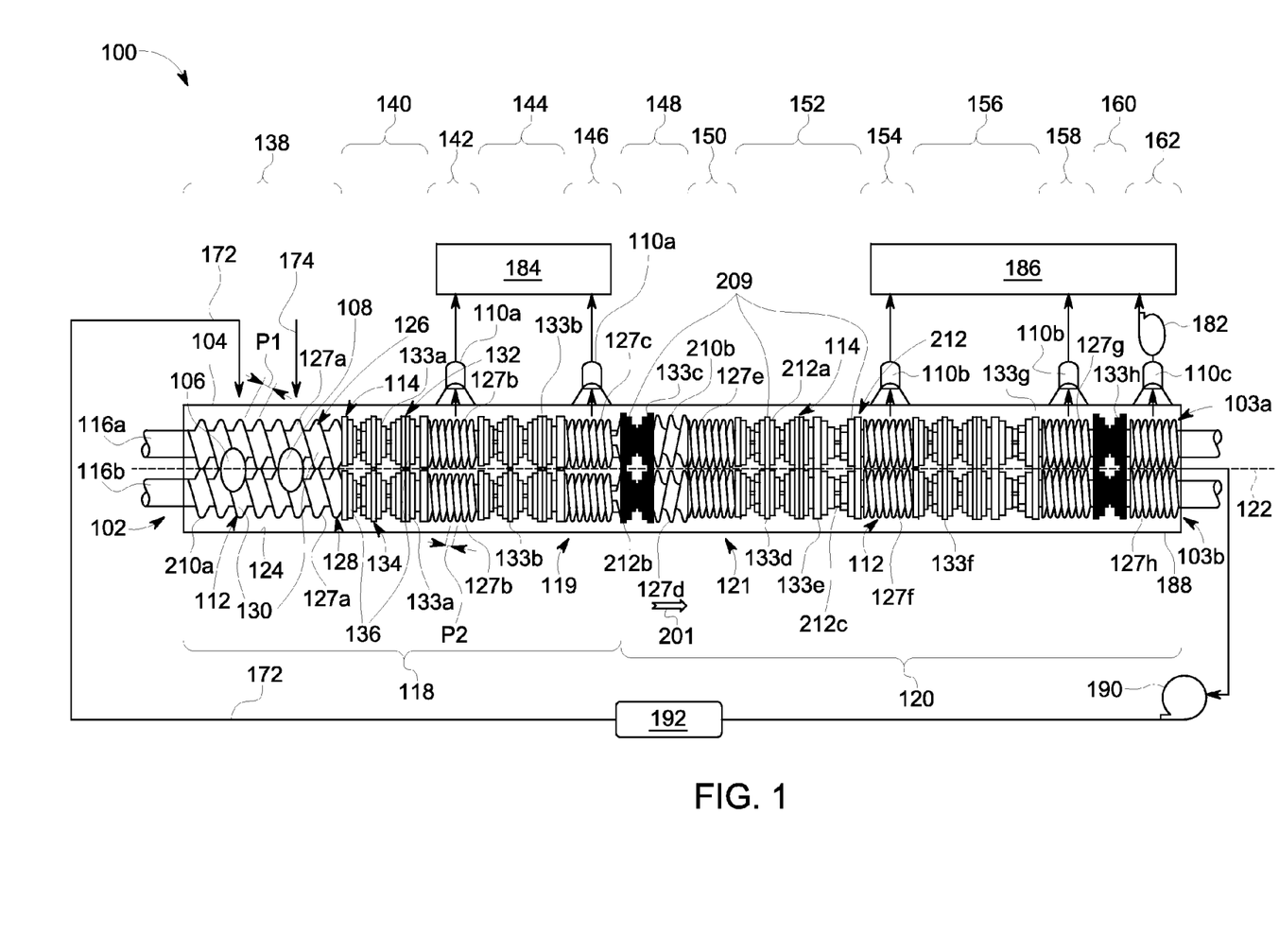
FIG. 1 is a schematic view of an exemplary treatment system for example, a single-stage system in accordance with an exemplary embodiment.

FIG. 1 is a schematic view of an exemplary treatment system 100 in accordance with one embodiment. The exemplary treatment system 100 comprises an extruder 102 having a barrel 104, a first inlet port 106, a second inlet port 108, and a plurality of outlet ports 110a, 110b, 110c. In the illustrated exemplary embodiment, the extruder 102 comprises a first extruder element 103a and a second extruder element 103b. Each extruder element 103a, 103b comprises a plurality of helical elements 112 and a plurality of kneading elements 114.

The plurality of helical elements 112 comprises a first set of screw elements 126 and a second set of screw elements 128. The plurality of kneading elements 114 comprises a first set of kneading elements 132 and a second set of kneading elements 134. In the illustrated embodiment, the first set of screw elements 126 and the first set of kneading elements 132 are coupled to each other and mounted on a shaft 116a. The second set of screw elements 128 and the second set of kneading elements 134 are coupled to each other and mounted on a shaft 116b. In other embodiments, the order of arrangement of the set of screw elements and the kneading elements may vary depending on the design and application.

In the illustrated embodiment, the first set of screw elements 126 is intermeshed with the second set of screw elements 128 to form a twin-screw helical unit 130. Similarly, the first set of kneading elements 132 is intermeshed with the second set of kneading elements 134 to form a twin-kneading unit 136. The first set of screw elements 126 and the second set of screw elements 128 are co-rotatable about a central axis 122 via the respective shafts 116a, 116b. Similarly, the first set of kneading elements 132 and the second set of kneading elements 134 are also co-rotatable about the central axis 122 via the respective shafts 116a, 116b. In some other embodiments, the first set of screw elements and kneading elements 126, 132 and the second set of screw elements and kneading elements 128, 134 may be counter-rotatable about the central axis 122 via the respective shafts 116a, 116b.

Each set of screw elements 126, 128 comprises a plurality of screw elements 127a, 127b, 127c, 127d, 127e, 127f, 127g, 127h. Each screw element may have a screw pitch different from the other screw elements. For example, the first screw element 127a has a first screw pitch "$P_1$" and the second screw element 127b has a second screw pitch "$P_2$". Each set of kneading elements 132, 134 comprises a plurality of kneading elements 133a, 133b, 133c, 133d, 133e, 133f, 133g, 133h. Each kneading element may have a profile different from the profile of other kneading elements. The plurality of screw elements 127a-127h and the plurality of kneading elements 133a-133h are disposed alternately and coupled to each other. The number, order of arrangement, length of the screw elements 127a-127h and the kneading elements 133a-133h may vary depending upon the design and application.

In the illustrated embodiment, the first and second extruder elements 103a, 103b are divided into a first conveying section 138, a first mixing/reaction section 140, a second conveying section 142, a second mixing/reaction section 144, a third conveying section 146, a first sealing section 148, a fourth conveying section 150, a first heating section 152, a fifth conveying section 154, a second heating section 156, a sixth conveying section 158, a second sealing section 160, and a compression section 162.

The first conveying section 138 comprises the first inlet port 106 for feeding a lean sorbent 172 and the second inlet port 108 for feeding a gaseous medium 174. The lean sorbent 172 may be supplied from a sorbent source (not shown in FIG. 1) and the gaseous medium 174 may be supplied from a gas source (not shown in FIG. 1). The second and third conveying sections 142, 146 comprise the outlet ports 110a for releasing a plurality of components (not shown in FIG. 1) removed from the gaseous medium 174. The fifth and sixth conveying sections 154, 158 comprise the outlet ports 110b for releasing a component (not shown in FIG. 1) removed from a rich sorbent (not shown in FIG. 1). The generation of the rich sorbent 180 is explained in detail below. The compression section 162 also comprises at least one outlet port 110c.

The first, second, and third conveying sections 138, 142, 146, the first and second mixing/reaction sections 140, 144, and a portion 119 of the barrel 104 together form an absorption unit 118. The absorption unit 118 is configured to absorb/remove a component from the gaseous medium 174 by reacting the lean sorbent 172 with the gaseous medium 174 so as to generate the rich sorbent 180.

The first and second sealing sections 148, 160, the fourth, fifth, and sixth conveying sections 150, 154, 158, the first and second heating sections 152, 156, the compression section 162, and a remaining portion 121 of the barrel 104 together form a desorption unit 120. The desorption unit 120 is configured to desorb/remove the component from the rich sorbent 180 so as to regenerate the lean sorbent 172. The extruder 102 further comprises a compressor 182 coupled to at least one outlet port 110c disposed proximate to an exit 188 of the desorption unit 120. Specifically, the compressor 182 is coupled to the outlet port 110c disposed at the compression section 162. The compressor 182 is used for compressing a portion of the component released via the at least one outlet port 110c.

The outlet ports 110a of the absorption unit 118 are further coupled to a first storage tank 184 for storing one or more components (not shown in FIG. 1) removed from the gaseous medium 174. Similarly, the outlet ports 110b, 110c in the desorption unit 120 are coupled to a second storage tank 186 for storing the component (not shown in FIG. 1) removed from the gaseous medium 174. Specifically, at least one outlet port 110c disposed at the exit 188 of the desorption unit 120 is coupled to the second storage tank 186 via the compressor 182.

The extruder 102 further comprises a pump 190 coupled to the exit 188 of the desorption unit 120 for recirculating the lean sorbent 172 via a cooler 192 to the first inlet port 106 of the absorption unit 118. In one embodiment, the cooler 192 may receive a coolant from a cooling tower (not shown in FIG. 1) to exchange heat between the lean sorbent 172 and the coolant so as to cool the lean sorbent 172 before feeding to the absorption unit 118.

The plurality of screw elements 127a, 127b, 127c, 127e, 127f, 127g, 127h are right handed screw elements. Each right-handed screw element 127a, 127b, 127c, 127e, 127f, 127g, 127h has a plurality of helical threads 210a oriented along a clockwise direction to convey material along a forward direction 201. The plurality of screw elements 127d are left handed screw elements. Each left-handed screw element 127d has a plurality of helical threads 210b oriented along a counter clockwise direction to generate a dynamic back pressure. Such a generation of back pressure facilitates to increase residence time of material flowing within the extruder 102 or seal the material against the barrel 104. It should be noted herein that the terms "helical element" and "screw element" "right handed screw element", "left handed screw element", "right handed helical element", "left handed helical element" may be used interchangeably.

The plurality of kneading elements 133a, 133b, 133d, 133f are right handed kneading elements. The plurality of kneading elements 133c, 133h are left handed kneading elements. The plurality of kneading elements 133e, 133g are neutral kneading elements. It should be noted herein that the terms "kneading element", "right handed kneading element", "left handed kneading element", and "neutral kneading element" may be used interchangeably. Each kneading element 133a, 133b, 133c, 133d, 133e, 133f, 133g, 133h comprises a plurality of profiled disks 212 stacked at an angle with respect to each other and define a wide crest that forms a wedge with respect to an inner surface 124 of the barrel 104. Such a wedge promotes heating, melting, mixing, and surface renewal of material conveyed through the extruder 102.

Specifically, each right-handed kneading element 133a, 133b, 133d, 133f has a plurality of profiled disks 212a stacked along the forward direction 201 and are used for transporting the material along the forward direction 201. Each left-handed kneading element 133c, 133h has a plurality of profiled disks 212b stacked along a direction opposite to the forward direction 201. Each left handed kneading element 133c, 133h generates a dynamic back pressure which facilitates to increase residence time of material flowing through the extruder 102 or seal the material against the inner surface 124 of the barrel 104. Each neutral kneading element 133e, 133g comprises a plurality of profiled disks 212c stacked at 90 degrees with respect to each other. Each neutral kneading element 133e, 133g generates heat and produces back flow to dynamically seal the material against the inner surface 124 of the extruder 102. Each right-handed kneading element 133a, 133b, 133d, 133f and the neutral kneading element 133e, 133g generates heat and also transports the material forward within the extruder 102.

In the illustrated embodiment, the right-handed screw elements 127a, 127b, 127c, 127e, 127f, 127g, 127h are disposed in the conveying sections 138, 142, 146, 150, 154, 158 and in the compression section 162 respectively. The left-handed screw elements 127d and left-handed kneading elements 133c are disposed in the first sealing section 148 and the left-handed kneading elements 133h are disposed in the second sealing section 160. The right-handed kneading elements 133a, 133b are disposed in the mixing/reaction sections 140, 144. The right-handed kneading elements 133d and the neutral kneading elements 133e are disposed in the first heating section 152, and the right handed kneading elements 133f and the neutral kneading elements 133g are disposed in the second heating section 156. The right-handed kneading elements 133a, 133b, 133d, 133f, the left-handed kneading elements 133c, 133h, and the neutral kneading elements 133e, 133g together form a kneading screw block 209.

In one embodiment, total length of the plurality of screw elements 127a, 127b, 127c in the absorption unit 118 is in a range of twenty percent to seventy percent of total length of the extruder 102. Total length of the plurality of kneading elements 133a, 133b in the absorption unit 118 is in a range of eighty percent to thirty percent of the total length of the extruder 102. Similarly; the total length of the plurality of screw elements 127d, 127e, 127f, 127g, 127h in the desorption unit 120 is in a range of twenty percent to eighty percent of the total length of the extruder 102. Similarly, the total length of the plurality of kneading elements 133c, 133d, 133e, 133f, 133g, 133h in the desorption unit 120 is in a range of eighty percent to twenty percent of the total length of the extruder 102.

The total length of the extruder 102, number and location of the inlet ports 106, 108, and the outlet ports 110a, 110b, 110c, the design of the extruder 102, and parameters such as feed rate, screw speed, barrel temperature, and distribution of pressure, and the like may be determined experimentally to optimize the extrusion process. The illustrated system 100 is a single stage system having the absorption unit 118 integrated to the desorption unit 120.

Figure 2:
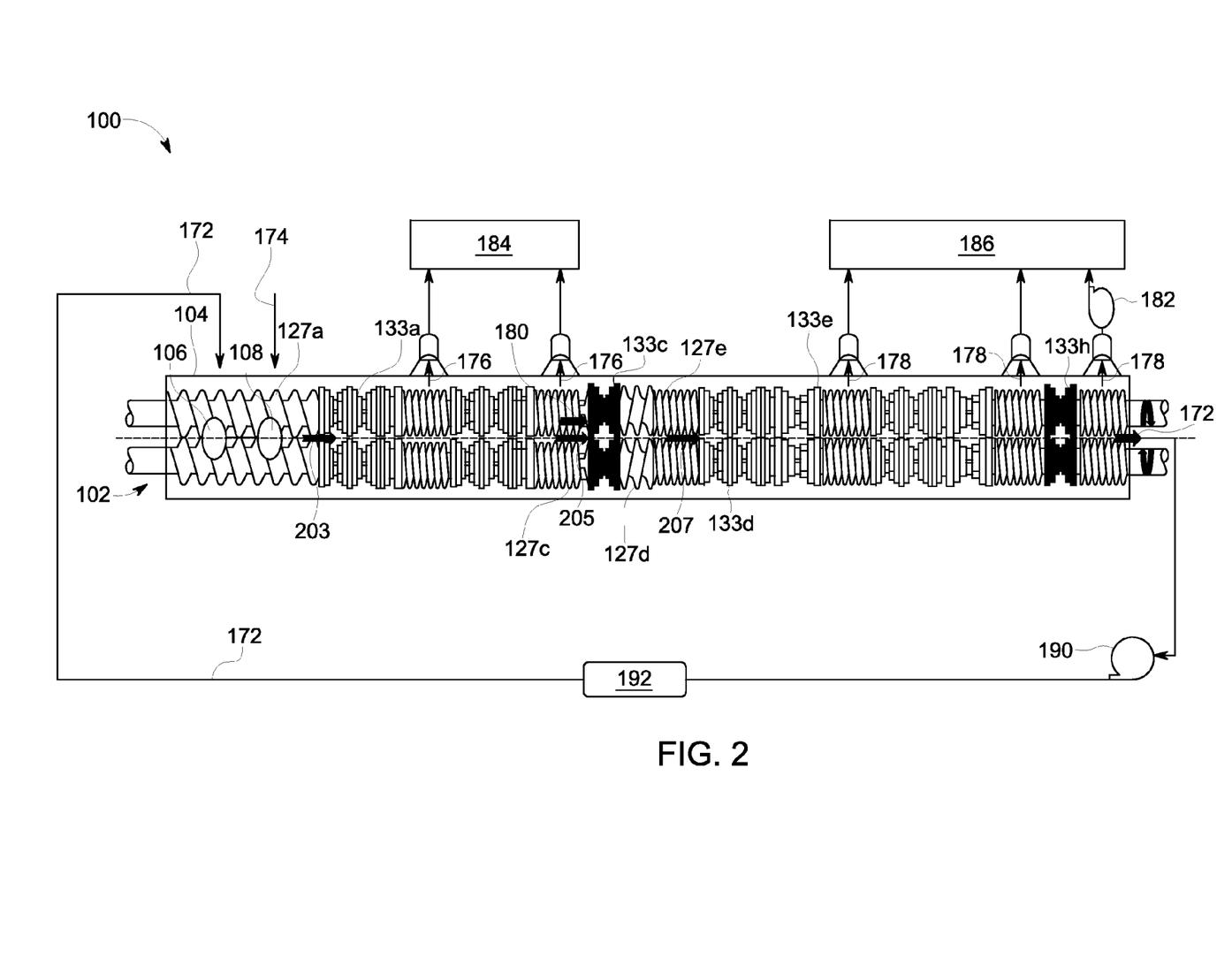
FIG. 2 is a schematic diagram illustrating single-stage system for treatment of a gaseous medium in accordance with the exemplary embodiment of FIG. 1.

FIG. 2 is a schematic representation of the single-stage system 100 showing treatment of the gaseous medium 174 in accordance with the exemplary embodiment of FIG. 1.

In one embodiment, the absorption unit 118 of the extruder 102 is configured to operate at an atmospheric pressure, and the desorption unit 120 excluding the compression section 162 is configured to operate at a pressure above the atmospheric pressure. The first sealing section 148 is configured to separate the section 146 from the section 150. The second sealing section 160 is configured to separate the section 158 from the section 162. It should be noted herein that the pressure within the extruder 102 is dependent on parameters such as type of component to be removed, quantity of component, feed rate of the gaseous medium, and the like.

In one exemplary embodiment, the lean sorbent 172 is an amino silicone of a GAP-0 or a GAP-1 medium. It should be noted herein that the term "GAP-0" may be defined as 1,3-bis(3-aminopropyl)-1,1,3,3-tetramethyldisiloxane. Similarly, the term "GAP-1" may be defined as 1,5-bis(3-aminopropyl)-1,1,3,3,5,5-hexamethyltrisiloxane. The gaseous medium 174 may be a flue gas, a combustion gas, a gasification gas, a landfill gas, a gas released from a furnace gas, a gas released from a steam generator, or the like. The plurality of components 176 of the gaseous medium 174 may comprise nitrogen dioxide ($NO_2$), oxygen, water, carbon monoxide, carbon dioxide ($CO_2$), or the like. A component 178 among the plurality of the components 176 may be $CO_2$, for example. It should be noted herein that the term "lean sorbent" may be referred to as a medium having a relatively low percentage of the component 178. Further, the term "rich sorbent" may be referred to as a medium having a relatively high percentage of the component 178.

In the illustrated embodiment, the first conveying section 138 receives the lean sorbent 172 and the gaseous medium 174. Specifically, the lean sorbent 172 and the gaseous medium 174 are fed via the first inlet port 106 and the second inlet port 108 respectively. The lean sorbent 172 and the gaseous medium 174 are transported by the plurality of right-handed screw elements 127a as indicated by the arrow 203.

The lean sorbent 172 is reacted with the gaseous medium 174 in the first mixing/reaction section 140. Specifically, the lean sorbent 172 and the gaseous medium 174 are mixed together inside the barrel 104 by the plurality of right-handed kneading elements 133a. As a result, a portion of a plurality of components 176 is removed from the gaseous medium 174. The reaction of lean sorbent 172 with the gaseous medium 174 is an exothermic reaction resulting in the generation of heat. The first mixing/reaction section 140 may be cooled by a cooling unit (not shown in FIG. 1) to predefined temperature limits The lean sorbent 172 absorbs the component 178 from the gaseous medium 174 to generate the rich sorbent 180.

The portion of the plurality of components 176 is discharged via the outlet port 110a in the conveying section 142 to the first storage tank 184. The lean sorbent 172 and the gaseous medium 174 are fed sequentially through the conveying sections 138, 142, 146, the mixing/reaction sections 140, 144, and a portion 119 of the absorption unit 118. In such a manner, the plurality of components 176 are progressively removed along the absorption unit 118 and discharged to the first storage tank 184 via the outlet ports 110a. In another embodiment, the plurality of components 176 are discharged directly to the environment.

The rich sorbent 180 generated from the absorption unit 118, is transported by the plurality of right-handed screw elements 127c as indicated by the arrow 205 to the first sealing section 148 in the desorption unit 120. In the first sealing section 148, a dynamic seal is established by pushing the rich sorbent 180 against the inner surface 124 of the barrel 104. Such a dynamic seal increases the pressure of the rich sorbent 180.

The rich sorbent 180 at a pressure higher than the atmospheric pressure, is transported to the fourth conveying section 150. The rich sorbent 180 is conveyed by the right-handed screw elements 127e as represented by reference numeral 207 from the fourth conveying section 150 to the first heating section 152. In the first heating section 152, the plurality of right-handed kneading elements 133d and the plurality of neutral kneading elements 133e convey the rich sorbent 180 forward and also generate heat for the rich sorbent 180. In one embodiment, the first heating section 152 is heated by a heating unit (not shown in FIG. 1) to predefined temperature limits. As a result, the rich sorbent 180 melted and a portion of the component 178 is desorbed from the rich sorbent 180.

A portion of the desorbed component 178 is discharged via the outlet port 110b in the conveying section 154 to the second storage tank 186. Thereafter, the rich sorbent 180 is fed to the second heating section 156. The second heating section 156 performs function similar to the first heating section 152. Further, the rich sorbent 180 is conveyed via the sixth conveying section 158 to the second sealing section 160. In the second sealing section 160, dynamic seal is established at a pressure above the atmospheric pressure by the plurality of left-handed kneading elements 133h. The rich sorbent 180 is fed from the second sealing section 160 into the compression section 162. The compression section 162 compresses the rich sorbent 180 and removes the remaining portion of the component 178 from the rich sorbent 180, and thereby regenerates the lean sorbent 172. The remaining portion of the component 178 is discharged via the outlet port 110c to the second storage tank 186. The compressor 182 is used to compress the remaining portion of the component 178 to a pressure above atmospheric pressure before feeding to the second storage tank 186.

In other words, the rich sorbent 180 is fed sequentially via the sealing sections 148, 160, the conveying sections 150, 154, 158, the heating sections 152, 156, the compression section 162, and a remaining portion 121 of the desorption unit 120. The component 178 is progressively desorbed along the desorption unit 120 and discharged to the second storage tank 186 via the outlet ports 110b, 110c.

The regenerated lean sorbent 172 is fed from the compression section 162 to the absorption unit 118 via the pump 190 and the cooler 192. Specifically, the lean sorbent 172 is recirculated to the inlet port 106 of the absorption unit 118.

The design of the treatment system 100 is modular and flexible since the plurality of helical elements 112 and the plurality of kneading elements 114 may be disassembled and assembled as per the requirement of the application.

Figure 3:
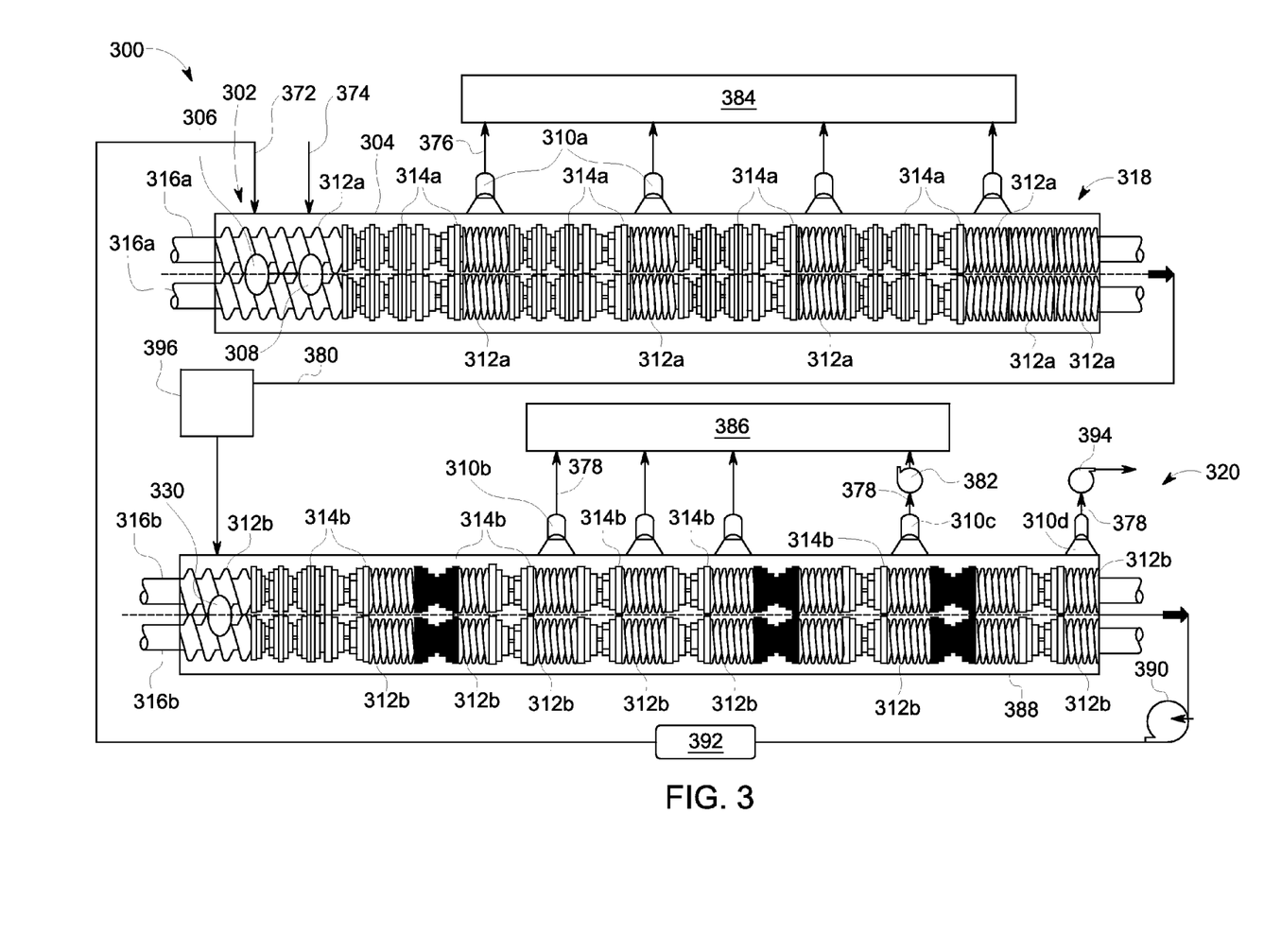
FIG. 3 is a schematic view of an exemplary treatment system, for example, a two-stage system in accordance with another exemplary embodiment.

FIG. 3 is a schematic view of an exemplary treatment system 300 in accordance with another exemplary embodiment. The exemplary treatment system 300 comprises an extruder 302 having a barrel 304, a first inlet port 306, a second inlet port 308, a third inlet port 330, and a plurality of outlet ports 310a, 310b, 310c. The extruder 302 is divided into an absorption unit 318 and a desorption unit 320. The absorption unit 318 comprises the first inlet port 306 for feeding a lean sorbent 372, the second inlet port 308 for feeding a gaseous medium 374, and the plurality of outlet ports 310a for discharging a plurality of components 376. A plurality of screw elements 312a are coupled to a plurality of kneading elements 314a and mounted on shafts 316a. The absorption unit 318 performs a similar function as the absorption unit 118 discussed with reference to the previous embodiment. The absorption unit 318 is used to progressively remove the plurality of components 376 from the gaseous medium 374. The plurality of components 376 are progressively discharged via the outlet ports 310a and discharged to a first storage tank 384. In another embodiment, the plurality of components 376 are discharged directly to the environment. The lean sorbent 372 absorbs a component 378 from the gaseous medium 374 and generates a rich sorbent 380. The rich sorbent 380 is then discharged from the absorption unit 318.

In the desorption unit 320, a plurality of screw elements 312b are coupled to a plurality of kneading elements 314b and mounted on shafts 316b. The desorption unit 320 comprises the third inlet port 330 for feeding the rich sorbent 380 received from the absorption unit 318. In the illustrated embodiment, the rich sorbent 380 is fed via a loss-in-weight feeder 396 to the third inlet port 330. The desorption unit 320 performs a similar function as the desorption unit 120 discussed with reference to the previous embodiment. The desorption unit 320 is used to progressively remove the component 378 from the rich sorbent 380 and regenerate the lean sorbent 372. The plurality of outlet ports 310b, 310c is used to discharge the removed component 378 to a second storage tank 386. In the illustrated embodiment, the outlet port 310c disposed at an exit 388 of the desorption unit 320 is coupled to the second storage tank 386 via a compressor 382. The compressor 382 is used to compress a portion of the component 378 before feeding into the second storage tank 386. The exit 388 further comprises an exit port 310d coupled to a vacuum pump 394. In the illustrated embodiment, the vacuum pump 394 is configured to remove traces of the component 378 via the exit port 310d and then discharge to the atmosphere. The regenerated lean sorbent 372 is conveyed to the first inlet port 306 of the absorption unit 318 via a pump 390 and a cooler 392.

In the illustrated embodiment, the treatment system 300 is a two-stage system having the absorption unit 318 disposed separately from the desorption unit 320. The absorption unit 318 is configured to operate at an atmospheric pressure and the desorption unit 320 is configured to operate at the atmospheric pressure and also at a pressure above the atmospheric pressure.

Figure 4:
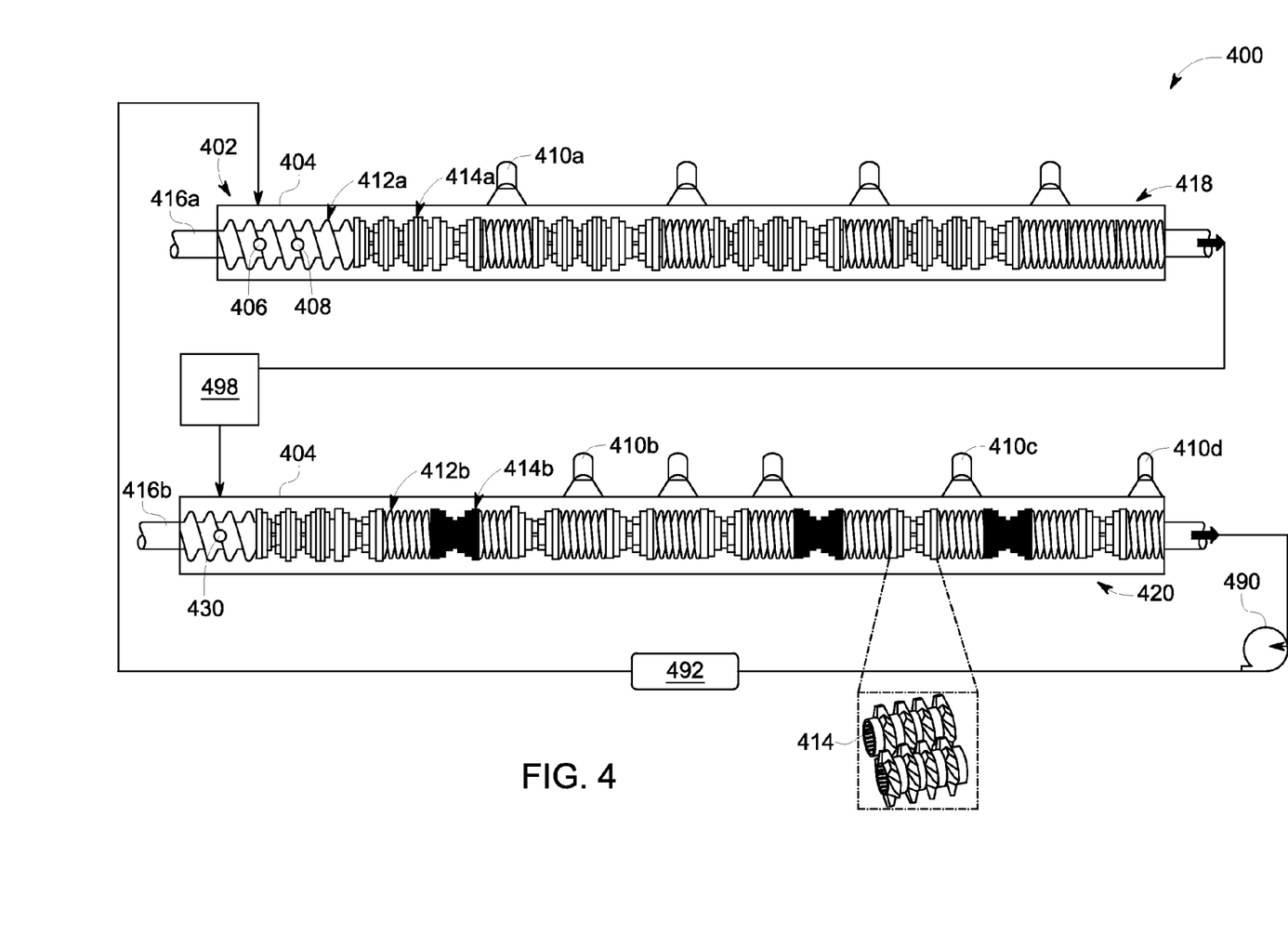
FIG. 4 is a schematic view of an exemplary treatment system in accordance with yet another exemplary embodiment.

FIG. 4 is a schematic view of an exemplary treatment system 400 in accordance with yet another exemplary embodiment. The treatment system 400 comprises an extruder 402 having a plurality of screw elements 412a coupled to a plurality of kneading elements 414a in an absorption unit 418 and a plurality of screw elements 412b coupled to a plurality of kneading elements 414b in a desorption unit 420. The extruder 402 further comprises a first inlet port 406, a second inlet port 408, and a plurality of third inlet ports 410a in the absorption unit 418. Further, the extruder 402 comprises a third inlet port 430 and a plurality of plurality of outlet ports 410b, 410c, 410d in the desorption unit 420. The treatment system 400 further comprises a feeder 498, a pump 490, and a cooler 492. The elements 412a, 414a are mounted on a shaft 416a and disposed within a barrel 404. Similarly, the elements 412b, 414b are mounted on a shaft 416b and disposed within a barrel 404. The plurality of helical screw elements 412a, 412b and the plurality of kneading elements 414a, 414b are coupled to each other and disposed alternately within the barrel 404. In the illustrated embodiment, the plurality of kneading elements 414b comprises a gear-type screw block 414. The treatment system 400 is a two-stage system having the absorption unit 418 disposed separately from the desorption unit 420.

Figure 5A:
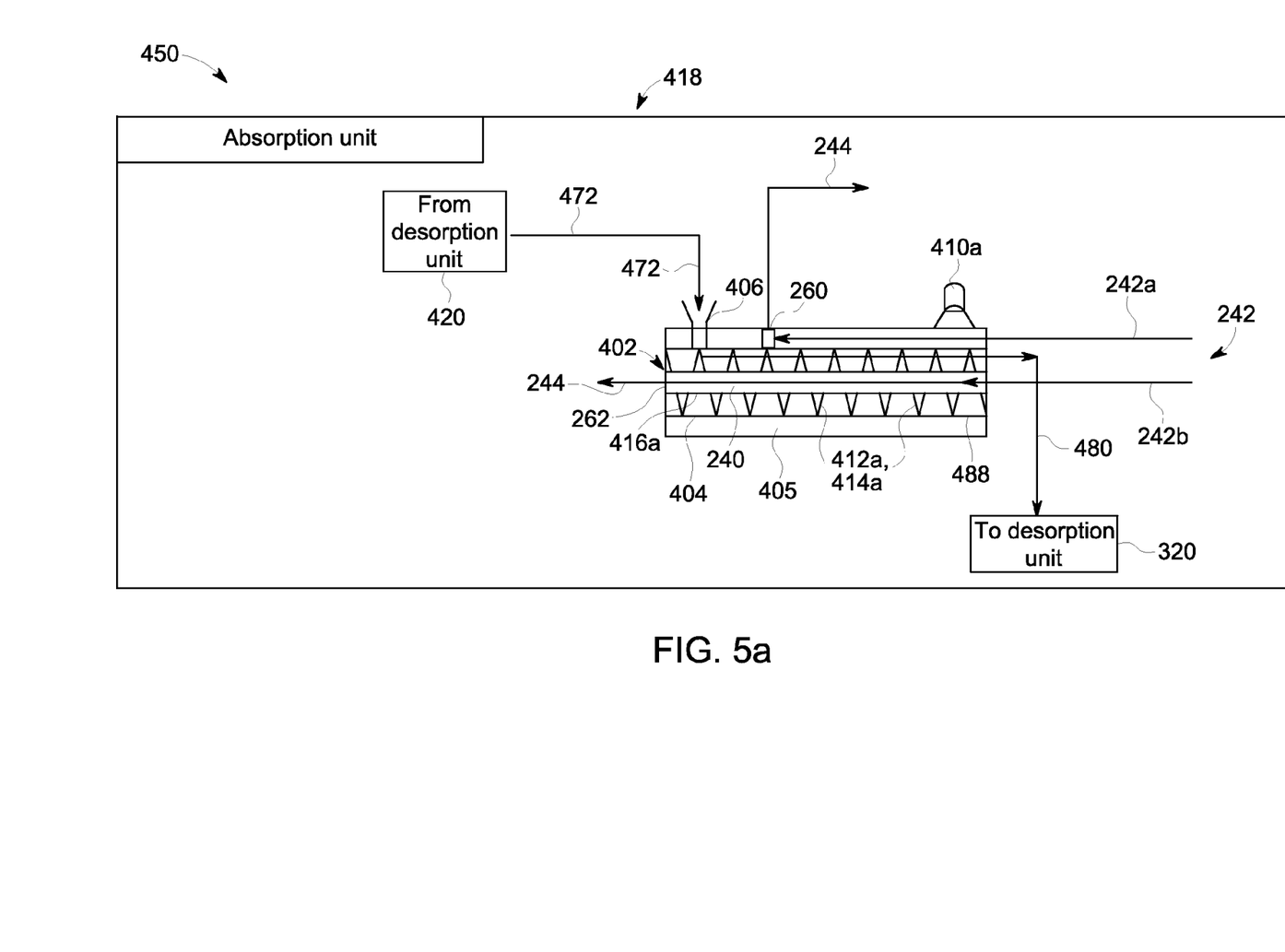
FIG. 5a is a block diagram of a portion of a barrel in an absorption unit in accordance with the exemplary embodiment of FIG. 4.

FIG. 5a is a block diagram of a portion 450 of the barrel 404 of the absorption unit 418 in accordance with the exemplary embodiment of FIG. 4. In the illustrated embodiment, a cooling unit 405 is disposed surrounding a portion 450 of the barrel 404. A cooling channel 240 is disposed within a portion of the shaft 416a.

A lean sorbent 472 is fed to the absorption unit 418 via a first inlet port 406. The lean sorbent 472 is conveyed along the absorption unit 418 and reacted with a gaseous medium. The lean sorbent 472 absorbs a component from the gaseous medium to generate a rich sorbent 480. The absorption reaction results in generation of heat, thereby heating the absorption unit 418. The cooling unit 405 is configured to receive a portion 242a of a coolant 242 and circulate the received portion 242a of the coolant 242 around the barrel 404 in the absorption unit 418. Similarly, the cooling channel 240 is configured to receive another portion 242b of the coolant 242 and circulate the received portion 242b of the coolant 242 within the portion of the shaft 416a. The coolant 242 is used to dissipate the heat generated in the absorption unit 418. The portions 242a, 242b of the coolant after absorption of heat, are discharged via a first exit port 260 and a second exit port 262 respectively. The rich sorbent 480 is then conveyed to a desorption unit 320. The absorption unit 418 comprises a plurality of outlet ports 410a for discharging a plurality of components removed from a gaseous medium.

Figure 5B:
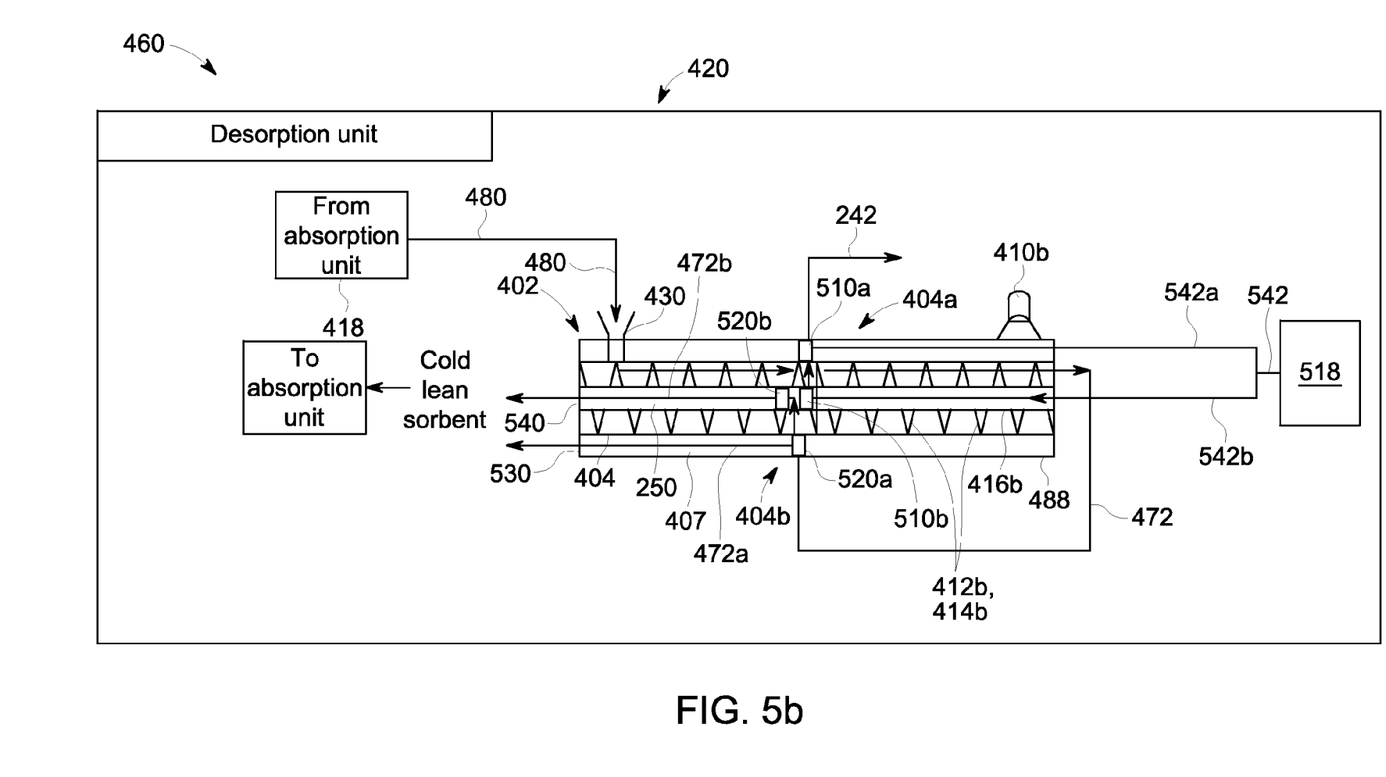

FIG. 5b is a block diagram of a portion 460 of the barrel 404 in the desorption unit 420 in accordance with the exemplary embodiments of FIGS. 4 and 5a. The barrel 404 comprises a heating unit 407 disposed surrounding the portion 460 of the barrel 404 in the desorption unit 420. The shaft 416b comprises a heating channel 250 disposed within the shaft 416b in the desorption unit 420.

The desorption unit 420 receives the rich sorbent 480 from the absorption unit 418 via the third inlet port 430. The rich sorbent 480 is conveyed along the desorption unit 420 and subjected to desorption reaction by supplying heat. The heating unit 407 is configured to receive a portion 542a of a hot fluid 542 and circulate the received portion 542a of the hot fluid 542 within a portion 404a of the barrel portion 460. Similarly, the heating channel 250 within the portion 404a of the barrel portion 460 is configured to receive another portion 542b of the hot fluid 542 and circulate the received portion 542b of the hot fluid 542 within the shaft 416b. The hot fluid 542 may be fed from a machine 518 such as a turbine, a steam engine, or the like, to the desorption unit 420. Another portion 404b of the barrel portion 460 is configured to receive a portion of 472a of the hot lean sorbent 472 via a port 520a and circulate the lean sorbent 472 in the portion 404b. Similarly, the heating channel 250 within the portion 404b of the barrel portion 460, is configured to receive another portion 472b of the lean sorbent 472 and circulate the received portion 472b of the lean sorbent 472 within the shaft 416b.

The portion 542a of the hot fluid 542 is discharged from the desorption unit 420 via a third exit port 510a. Similarly, the portion 542b of the hot fluid 542 is discharged from the desorption unit 420 via a fourth exit port 510b and the third exit port 510a. The portion 472a of the lean sorbent 472 is discharged from the desorption unit 420 via a fifth exit port 530. The portion 472b of the lean sorbent 472 is discharged from the desorption unit 420 via a sixth exit port 540. The lean sorbent 472 is recirculated back to the absorption unit 418.

The desorption unit 420 comprises the plurality of outlet ports 410b, 410c, 410d for discharging a component removed from the rich sorbent 480.

Figure 5C:
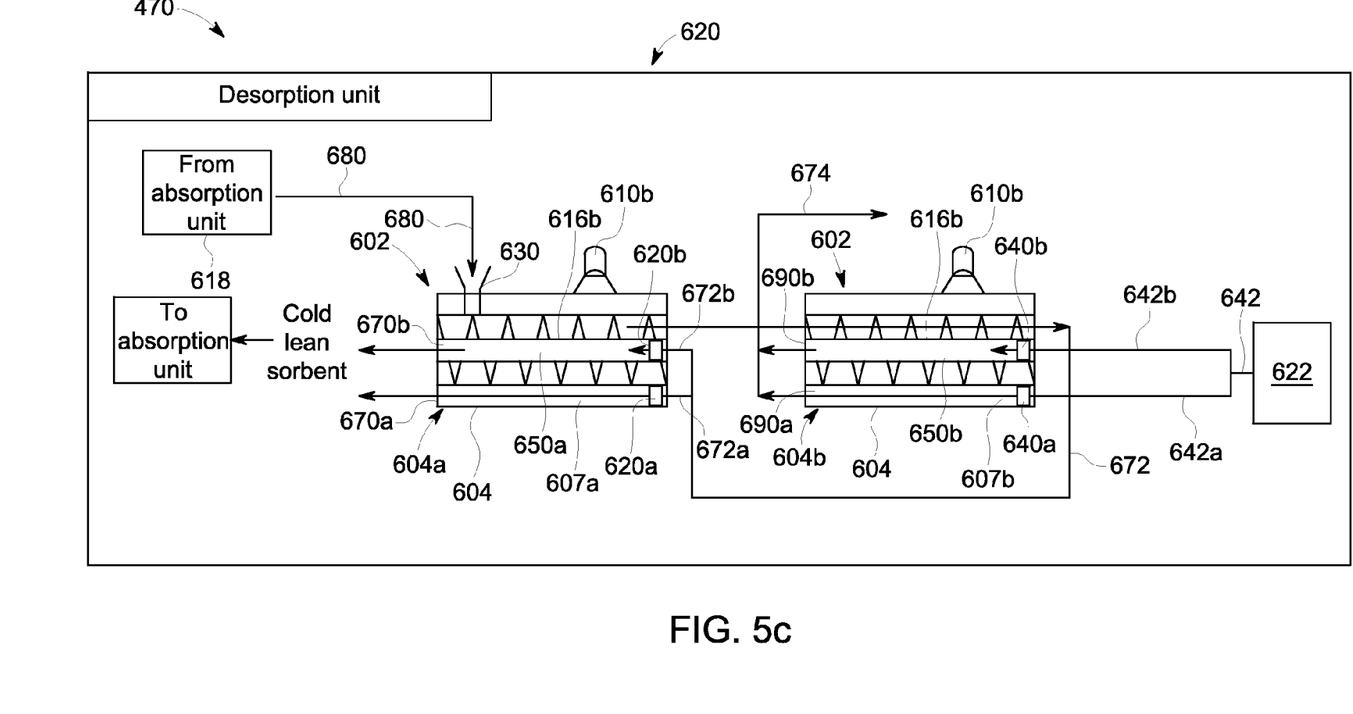
FIG. 5c is a block diagram of a portion of a barrel in a desorption unit in accordance with another exemplary embodiment.

FIG. 5c is a block diagram of a portion 470 of a barrel 604 in a desorption unit 620 in accordance with another exemplary embodiment. In the illustrated embodiment, the portion 470 of the barrel 604 is shown as split into two halves 604a, 604b for explanation purpose. The barrel 604 comprises heating units 607a, 607b disposed surrounding the portion 470 of the barrel 604 in the desorption unit 620. Heating channels 650a, 650b are disposed within a shaft 616b in the desorption unit 620.

The desorption unit 620 receives a rich sorbent 680 from an absorption unit 618 via an inlet port 630. The heating unit 607a is configured to receive a portion 672a of a hot lean sorbent 672 via a port 620a and circulate the lean sorbent portion 672a around the barrel portion 604a. The heating channel 650a is configured to receive another portion 672b of the hot lean sorbent 672 via a port 620b and circulate the lean sorbent portion 672b within the shaft 616b.

Similarly, the heating unit 607b is configured to receive a portion 642a of a hot fluid 642 via a port 640a and circulate the hot fluid portion 642a around the barrel portion 604b. The heating channel 650b is configured to receive another portion 642b of the hot stream 642 via a port 640b and circulate the hot fluid portion 642b within the shaft 616b. The hot fluid 642 may be fed from a machine 622 such as turbine, steam engine, or the like to the desorption unit 620.

The lean sorbent portion 672a is discharged from the desorption unit 620 via a first exit port 670a and the lean sorbent portion 672b is discharged from the desorption unit 620 via a second exit port 670b. Similarly, the hot fluid portion 64a is discharged from the desorption unit 620 via a third exit port 690a and the hot fluid portion 642b is discharged from the desorption unit 620 via a fourth exit port 690b. The desorption unit 620 comprises a plurality of outlet ports 610b for discharging a component removed from the rich sorbent 680.

Embodiments of the present invention discussed herein facilitate the extruder to perform the reactions at relatively high pressure. The exemplary extruder facilitates an effective way of removing a component from a gaseous medium and thereafter enabling regeneration of a lean sorbent.

The invention claimed is:

1. A method for treatment of a gaseous medium, the method comprising:
reacting a lean sorbent with the gaseous medium within an absorption unit to absorb a component from the gaseous medium and generate a rich sorbent;
feeding the rich sorbent from the absorption unit to a desorption unit; and
desorbing the component from the rich sorbent in the desorption unit and regenerate the lean sorbent, wherein the reacting, feeding, and desorbing are performed via a plurality of helical elements and a plurality of kneading elements mounted on a shaft disposed within a barrel of an extruder, wherein the plurality of helical elements are coupled to the plurality of kneading elements, wherein the barrel, the plurality of helical elements and the plurality of kneading elements together form the absorption unit and the desorption unit.

2. The method of claim 1, further comprising compressing a portion of the desorbed component released via at least one outlet port disposed proximate to an exit of the desorption unit.

3. The method of claim 1, further comprising cooling the lean sorbent released from the desorption unit and recirculating a cooled lean sorbent to the absorption unit.

4. The method of claim 1, further comprising feeding a cooling medium through at least one of a cooling unit coupled to a portion of the barrel in the absorption unit and a cooling channel disposed within the shaft, in the absorption unit.

5. The method of claim 4, further comprising feeding a heating medium through at least one of a heating unit coupled to another portion of the barrel in the desorption unit and a heating channel disposed within the shaft, in the desorption unit.

6. The method of claim 5, wherein the heating medium is at least one of the lean sorbent and a flue gas from a machine.

7. The method of claim 1, further comprising generating a dynamic back pressure against a flow of the rich sorbent in at least one section of the desorption unit via at least one element from the kneading element and helical element.

8. The method of claim 1, further comprising conveying the gaseous medium, the lean sorbent, and the rich sorbent via the plurality of helical elements and the plurality of kneading elements.

9. The method of claim 1, wherein the reacting further comprises mixing the gaseous medium and the lean sorbent via the plurality of kneading elements.

10. The method of claim 1, further comprising compressing the rich sorbent or the lean sorbent against an inner surface of the barrel, via the plurality of kneading or helical elements.

\* \* \* \* \*